(12) United States Patent
Palys et al.

(10) Patent No.: US 10,330,558 B2
(45) Date of Patent: Jun. 25, 2019

(54) LEAKAGE TESTING TOOL FOR COMPONENT AND RELATED METHOD

(71) Applicant: General Electric Company, Schenectady, NY (US)

(72) Inventors: Dariusz Oliwiusz Palys, Gebenstorf (CH); Daniele Mascaro, Wettingen (CH); Michael Thomas Maurer, Bad Sackingen (DE); Marcel Georg Rieker, Niedergosgen (CH)

(73) Assignee: General Electric Company, Schenectady, NY (US)

( * ) Notice: Subject to any disclaimer, the term of this patent is extended or adjusted under 35 U.S.C. 154(b) by 181 days.

(21) Appl. No.: 15/585,733

(22) Filed: May 3, 2017

(65) Prior Publication Data

US 2018/0321108 A1  Nov. 8, 2018

(51) Int. Cl.
  *G01M 3/26* (2006.01)
(52) U.S. Cl.
  CPC .................................. *G01M 3/26* (2013.01)
(58) Field of Classification Search
  CPC ........ G01M 3/022; G01M 3/025; G01M 3/26; G01M 3/28
  See application file for complete search history.

(56) References Cited

U.S. PATENT DOCUMENTS

| 4,646,559 | A | * | 3/1987 | Toelke | G01M 3/2853 |
| | | | | | 73/46 |
| 2012/0285222 | A1 | * | 11/2012 | Howlett | E21B 21/10 |
| | | | | | 73/49.8 |
| 2014/0175753 | A1 | * | 6/2014 | Antoine | F16J 15/344 |
| | | | | | 277/358 |
| 2014/0238111 | A1 | * | 8/2014 | Tsuruta | G01M 5/0058 |
| | | | | | 73/49.8 |

FOREIGN PATENT DOCUMENTS

| JP | 1996219284 A | 8/1996 |
| JP | 1999351465 A | 12/1999 |

* cited by examiner

*Primary Examiner* — Son T Le
*Assistant Examiner* — Alexander A Mercado
(74) *Attorney, Agent, or Firm* — Dale Davis; Hoffman Warnick LLC

(57) ABSTRACT

Various embodiments include a tool for leakage testing a component, along with a related testing method. In some cases, the tool includes: a seal assembly for sealing an opening in the component, the seal assembly having: a front plate defining a pressure chamber around the opening in the component; a collar coupled with the front plate and surrounding sidewalls of the component; an insert extending between the front plate and the collar; an annular seal member between the collar and the insert; and a floating seal between the collar and the front plate, wherein the seal assembly is configured to flexibly seal the opening in the component; and a valve for controlling fluid flow into the pressure chamber during the leakage testing of the component.

20 Claims, 4 Drawing Sheets

LEAKAGE TESTING TOOL FOR COMPONENT AND RELATED METHOD

FIELD OF THE INVENTION

The subject matter disclosed herein relates to component testing. More particularly, the subject matter disclosed herein relates to structures and methods for testing components.

BACKGROUND OF THE INVENTION

In many industrial systems, components are tested for leakage, e.g., before installation, during maintenance or repair, or in replacement. In some particular industrial machinery, such as combustion systems and fuel systems, components can be subject to high temperatures and pressures, and it may be beneficial to determine whether those components are prone to leakage under operating conditions.

However, it can be difficult to leakage test components that have rough surfaces or thin walls, due to the challenges in adequately sealing such surfaces and walls to perform testing. This may be particularly challenging in the case of additively manufactured (AM) components, such as those formed by selective laser melting (SLM) or direct metal laser melting (DMLM).

BRIEF DESCRIPTION OF THE INVENTION

Various embodiments include a tool for leakage testing a component, along with a related testing method. In a first aspect, the tool includes: a seal assembly for sealing an opening in the component, the seal assembly having: a front plate defining a pressure chamber around the opening in the component; a collar coupled with the front plate and surrounding sidewalls of the component; an insert extending between the front plate and the collar; an annular seal member between the collar and the insert; and a floating seal between the collar and the front plate, wherein the seal assembly is configured to flexibly seal the opening in the component; and a valve for controlling airflow into the pressure chamber during the leakage testing of the component.

A second aspect of the disclosure includes a method of leakage testing a component, the method including: coupling a leakage testing tool to an opening in the component, the leakage testing tool having: a seal assembly for sealing an opening in the component, the seal assembly having: a front plate defining a pressure chamber around the opening in the component; a collar coupled with the front plate and surrounding sidewalls of the component; an insert extending between the front plate and the collar; an annular seal member between the collar and the insert; and a floating seal between the collar and the front plate; and a valve for controlling air flow into the pressure chamber; flowing air into the pressure chamber and the opening in the component through the valve; and measuring a fluid flow or a pressure within the pressure chamber to detect a leak in the component.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
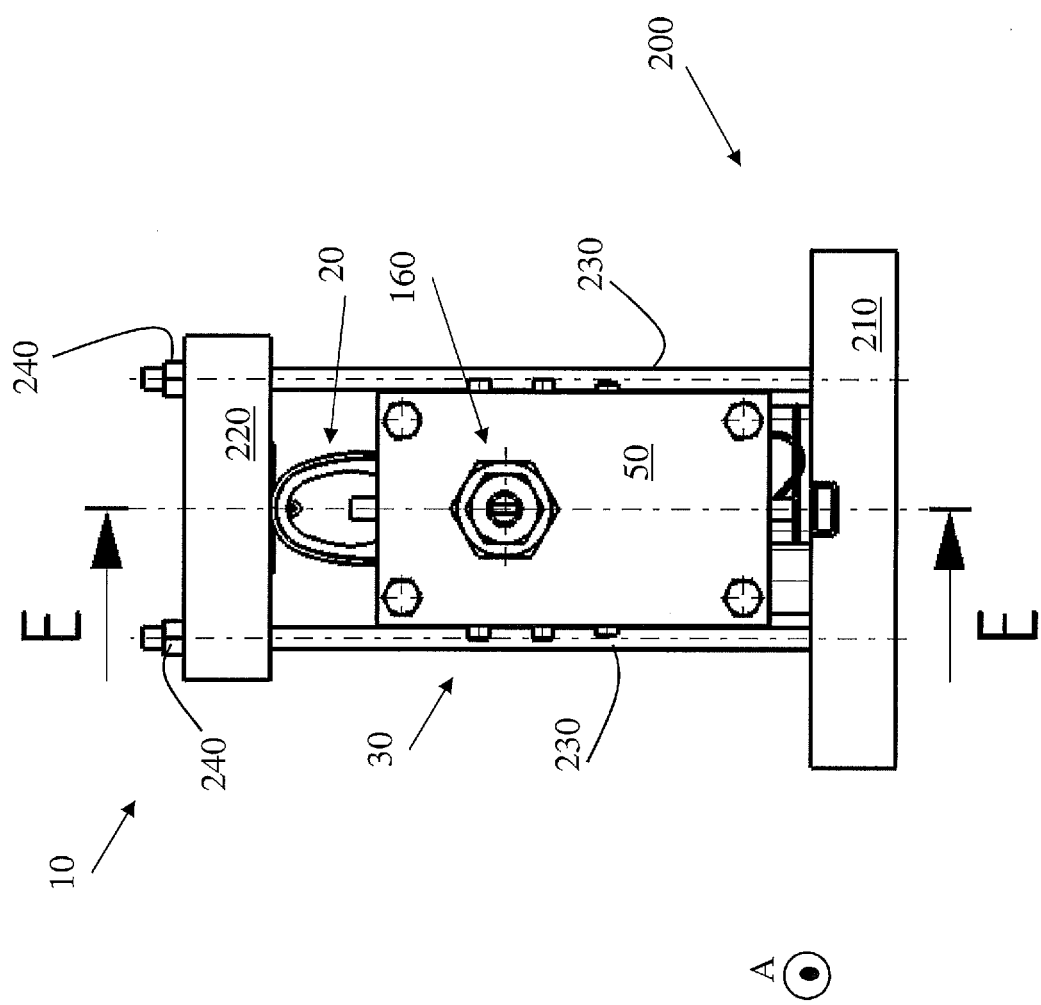
FIG. 1 shows a schematic end view of a tool for leakage testing a component according to various embodiments of the disclosure.

It is noted that the drawings of the various aspects of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated herein, the subject matter disclosed relates to component testing. More particularly, the subject matter disclosed herein relates to structures and methods for testing components.

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative.

As noted herein, it can be difficult to leakage test components that have rough surfaces or thin walls, due to the challenges in adequately sealing such surfaces and walls to perform testing. This may be particularly challenging in the case of additively manufactured (AM) components, such as those formed by selective laser melting (SLM) or direct metal laser melting (DMLM).

According to various embodiments of the disclosure, a tool is configured to seal an AM component or any other component having a rough or uneven surface (or thin wall) for leakage testing. The tool can include a frame for retaining the component during leakage testing, a pressure chamber for coupling with an opening in the component, and a seal assembly coupled with the pressure chamber for surrounding the opening in the component and providing a seal during testing. In various embodiments, the pressure chamber is connected to a valve for providing test air flow into the chamber. The seal assembly can include a front plate forming the pressure chamber around the opening in the component, a collar coupled with the front plate and surrounding sidewalls of the component, and an insert extending between the front plate and the collar. The collar can include an angled interface proximate the insert, where an annular seal member (e.g., an O-ring) is located to flexibly seal the collar and the insert against the sidewalls of the component. Additionally, the collar and the front plate can include corresponding slots sized to fit a floating seal extending therebetween. The floating seal and the annular seal member can allow the seal assembly to flex in sealing a component, such as a component with a rough or uneven surface, or a component having a thin, flexible wall. In various embodiments, the collar can include one or more retaining members for holding the component within the pressure chamber.

Figure 2:
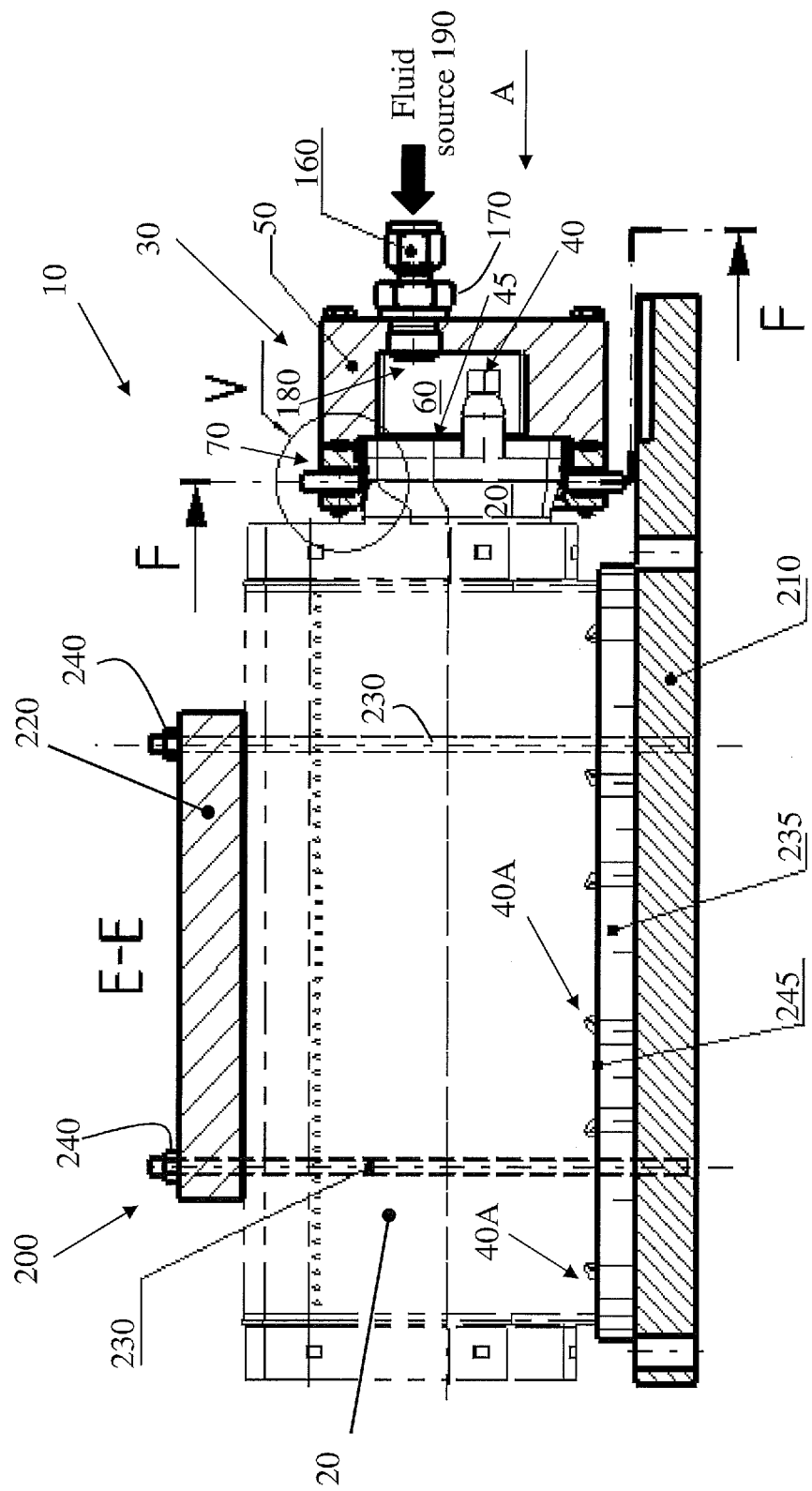
FIG. 2 shows a cross-sectional view of the tool and component through plane E-E of FIG. 1.
Figure 3:
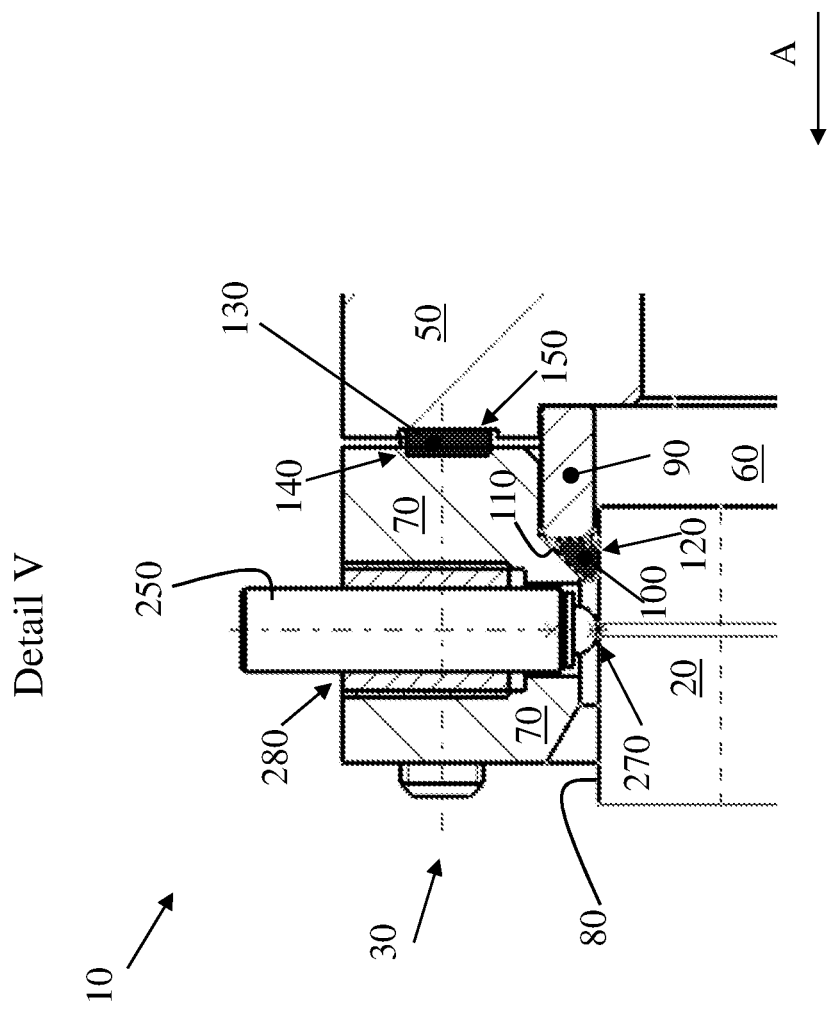
FIG. 3 shows a close-up partial cross-sectional view of detail V from FIG. 2.
Figure 4:
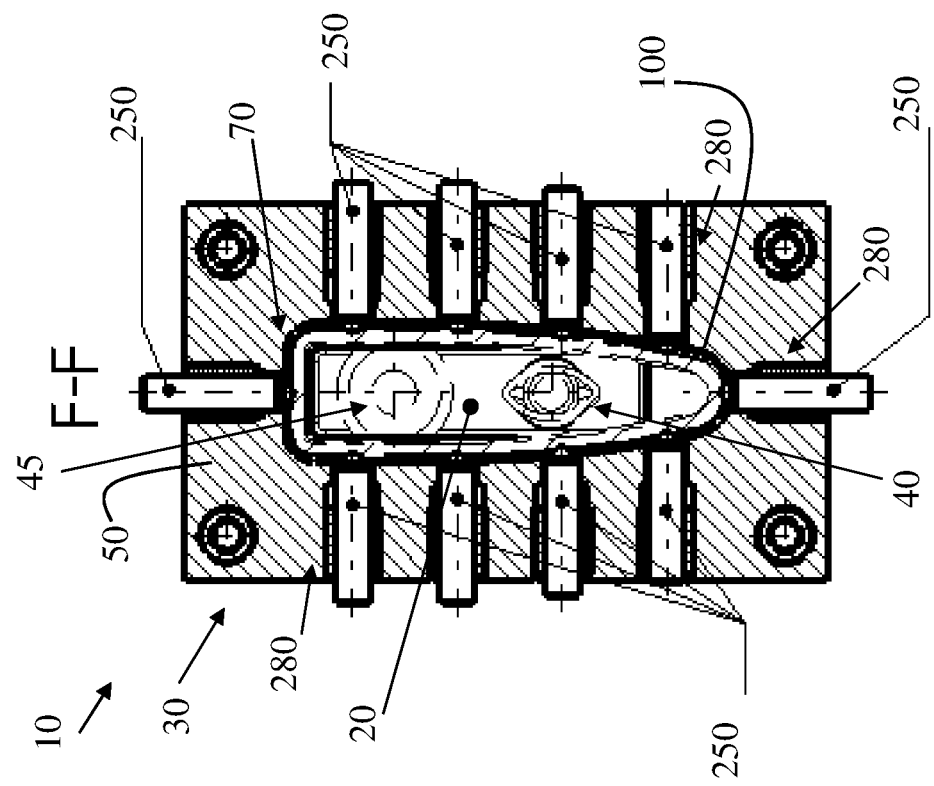
FIG. 4 shows a cross-sectional view of a portion of the component and tool of FIGS. 1-3 through plane F-F in FIG. 2.

FIG. 1 shows a schematic end view of a tool 10 for leakage testing a component 20. FIG. 2 shows a cross-sectional view of tool 10 and component 20 through plane E-E of FIG. 1. FIG. 3 shows a close-up partial cross-sectional view of detail V from FIG. 2. FIG. 4 shows a cross-sectional view of a portion of component 20 and tool 10 through plane F-F in FIG. 2. FIGS. 1-4 are referred to simultaneously herein.

With particular reference to FIGS. 1 and 2, tool 10 is configured to leakage test a component 20. In some cases, component 20 can include a machine component, such as a turbomachine component like a gas turbomachine blade, nozzle, fuel system component, or combustion component. However, component 20 can include any conventional component which may benefit from leakage testing. In some cases, component 20 includes an additively manufactured (AM) component. In various particular cases, component 20 includes an uneven or rough surface, such as one with a surface roughness of approximately RA 5 to approximately RA 50 in micrometers, e.g., a roughness (N) rating by the International Organization for Standardization above approximately N9 (RA 6.3), and in some particular cases, a rating between N9 (RA 6.3) and N12 (RA 50). In other cases, component 20 may have a thinned or partially thinned wall, which may be subject to flexion during operation and/or conventional leakage testing. This flexion may present challenges in sealing such a component for testing. In some cases, tool 10 can be particularly helpful in testing components with uneven or rough surface(s), or those with thinned walls, as it includes a flexible seal configuration. Further, tool 10 can be helpful in testing components having walls or other features in close proximity to one another (including thinned walls), where conventional testing mechanisms are unable to seal these tightly spaced features.

Tool 10 can include a seal assembly 30 for sealing an opening 40 (FIG. 2) in component 20. It is understood that opening 40 may represent one of many openings in component 20 which may be tested using tool 10. For example, in some cases, an additional opening 45, as shown in FIGS. 2 and 4, can be sealed within seal assembly 30 for leakage testing. In some cases, additional opening 45 can include a chamber opening that is fluidly connected with opening 40, or fluidly isolated from opening 40 in component 20. In some cases, openings 40, 45 are tested separately for leakage, but in other cases, openings 40, 45 can be tested concurrently. Openings 40, 45 can be referred to herein collectively, or individually as "opening." In various embodiments, one or more portions of tool 10 can be formed of a metal, such as steel, aluminum, brass, a hard plastic such as Polytetrafluoroethylene (PTFE), or other suitable metals or alloys, or may be formed of a composite material. In some particular cases, tool 10 can include hardened steel (e.g., hardened tool steel). In any case, seal assembly 30 can be configured to seal opening 40, 45 in component 20, which may be a test opening formed specifically for leakage testing. Seal assembly 30 can have several components, which may be coupled via conventional mechanical means, e.g., via hinging, pins, bolts, screws, weld or braze joints, pressure fitting, fastening or adhesive.

Seal assembly 30 can include a front plate 50 defining a pressure chamber 60 around opening 40, 45 in component 20. As described herein, front plate 50 is configured to fit around opening 40 and form pressure chamber 60 (when pressurized) which is used in leakage testing component 20. Coupled with front plate 50 is a collar 70 (FIG. 2, FIG. 3), which surrounds sidewalls 80 of component 20. With particular reference to FIG. 3, it can be seen that collar 70 is configured to contact sidewalls 80 and aid in sealing component 20. Collar 70 can extend circumferentially (e.g., with reference to primary axis A of opening) around component 20 along sidewalls 80, and can be configured to conform to sidewalls 80 of component 20. FIG. 3 further illustrates that tool 10 can include an insert 90 extending between front plate 50 and collar 70. Insert 90 can be pressure-fit between front plate 50 and collar 70, or otherwise coupled with one or both of front plate 50 or collar 70. Tool 10 can further include an annular seal member 100 between collar 70 and insert 90, for providing a flexible seal around sidewalls 80 of component 20. In some cases, annular seal member 100 can be formed of a rubber, deformable plastic or flexible composite material, and is sized to wrap around component 20 forming part of an annular seal. In various embodiments, annular seal member 100 includes an O-ring. In some particular cases, collar 70 includes an angled interface 110 proximate insert 90, defining a space 120 between collar 70 and insert 90. In these cases, annular seal member 100 is sized to fill the space 120 and provide a flexible seal. That is, annular seal member 100 permits insert 90 to move relative to collar 70 while maintaining a seal between collar 70 and sidewalls 80 of component 20. Tool 10 can also include a floating seal 130 between collar 70 and front plate 50. Floating seal 130 can be formed of a similar material as annular seal member 100, and can wrap around component 20 to form part of the annular seal. In some cases, collar 70 includes a first sealing slot 140 (extending annularly around collar 70), and front plate 50 includes a second sealing slot 150 (extending annularly around front plate 50) opposing the first sealing slot 140. In various embodiments, floating seal 130 extends between first sealing slot 140 and second sealing slot 150, and permits front plate 50 to move relative to collar 70 while maintaining a seal between front plate 50 and collar 70, e.g., in case of leakage over insert 90.

With reference to FIG. 2, in various embodiments, tool 10 can also include a valve 160, extending through front plate 50, e.g., for controlling airflow into pressure chamber 60. Valve 160 can permit flow of air or other fluid into pressure chamber 60 in order to pressurize chamber 60. Valve 160 can be manually, electro-mechanically or electrically (e.g., digitally) controlled, according to conventional means, in order to permit or restrict the flow of air or other fluid into pressure chamber 60. In various embodiments, valve 160 can include a pressure gauge 170 for measuring a pressure of the air or other fluid within pressure chamber 60, and a flow meter 180 for measuring flow of the air or fluid from pressure chamber 60 into component 20, e.g., when a leak is detected. In operation, tool 10 is mounted to component 20 in order to form a seal around opening 40 and create pressure chamber 60. A fluid source (e.g., air source) 190 is coupled with valve 160 to provide fluid to pressure chamber 60. Pressure gauge 170 can be used to measure the pressure of fluid inside the pressure chamber 60. In particular cases, pressure gauge 170 can measure a baseline pressure within pressure chamber 60 after filling pressure chamber 60 with air or other fluid. The measured baseline pressure can define a benchmark pressure level by which leakage is detected, e.g., if pressure within chamber 60 drops from this level while component 20 is sealed, the pressure drop may be due to fluid leakage through component 20. Similarly, flow meter 180 can be used to detect flow of fluid from pressure chamber 60 after the baseline pressure has been established, giving another indicator of potential leakage in component 20.

According to various embodiments, seal assembly 30 is configured to flexibly seal opening 40, 45 in component, such that air flowing into pressure chamber 60 flows entirety through opening 40, 45. When opening 40, 45 is sealed in such a manner, tool 10 can effectively detect leakage within component 20, as described herein.

Returning to FIG. 2, according to various embodiments, tool 10 can further include a frame 200 for supporting component 20. In some cases, frame 200 includes a base plate 210, a top plate 220 and a connecting rod 230 coupling base plate 210 and top plate 220. In some cases, frame 200 can include a plurality of connecting rods 230 extending between base plate 210 and top plate 220. Frame 200 can also include one or more locking members 240 for locking top plate 220 relative to base plate 210. In some cases, locking member(s) 240 can include a screw, bolt, sleeve, threaded member, etc., for engaging connecting rod 230 and locking top plate 220 in position relative to base plate 210. In various particular embodiments, connecting rod 230 includes a threaded outer surface, and locking members 240 include members having a threaded inner surface, such as a threaded sleeve or nut, and locking members 240 are movable along connecting rod 230 to loosen/tighten top plate 220 with respect to component 20. Frame 200 can be formed of a metal, alloy or composite, and can have sufficient weight and strength to anchor component 20 during leakage testing. It is understood that frame 200 can take various forms for supporting component 20 during leakage testing, and the depicted configuration is only one example. In some cases, frame 200 is coupled with seal assembly 30, e.g., mechanically coupled or hinged together, however, frame 200 can stand alone from seal assembly 30 in some cases. In various embodiments, frame 200 can also include an interface 235 including a seal member 245 for sealing any additional apertures 40A in component 20. In this case, component 20 may have additional apertures 40A along one or more surfaces, e.g., additional sidewalls 80, and seal member 245 can seal those additional apertures 40A in order to aide in leakage testing of component 20 as described herein. In some cases, interface 235 and seal member 245 can be coupled with base plate 210, however, it is understood that interface 235 and seal member 245 can be located along any sidewall 80 of component 20 to aid in sealing additional apertures 40A while leakage testing component 20.

FIGS. 3 and 4 illustrate additional aspects of tool 10, in particular, where collar 70 includes at least one retaining member 250 for holding component 20 adjacent pressure chamber 60. In some cases, retaining member(s) 250 include, e.g., pins, bolts, screws, positioned to align component 20 within collar 70 and retain component 20 relative to pressure chamber 60. In some cases, retaining members 250 extend through collar 70 in a direction approximately perpendicular to the direction of air or fluid flow into component 20. In some cases, retaining members 250 can include a contact surface 270 for retaining component 20 along the direction of air or other fluid flow into opening 40, 45 (or other openings within chamber 60). That is, in some cases, contact surface 270 can include a surface having a high coefficient of friction, e.g., greater than 0.5, and in some cases, approaching 1.0. In various embodiments, contact surface 270 is arced or convex, and in some cases, contact surface 270 is at least partially deformable to increase the surface area contact against sidewalls 80. In any case, retaining members 250 can extend through slots 280 in collar 70, and can be actuated to tighten/loosen collar 70 around sidewalls 80. Slots 280 can be threaded, notched or sleeved to receive retaining members 250 and maintain the position of retaining members 250 against sidewalls 80 as desired. In various embodiments, retaining members 250 are individually adjustable to tighten/loosen collar 70 against sidewalls 80 of component. That is, according to various embodiments, retaining member 250 can allow collar 70 (and seal assembly 30) to effectively seal against sidewalls 80 where those sidewalls 80 include rough or uneven surfaces.

In various embodiments, sidewalls 80 of component 20 include at least one uneven, or rough, surface. That is, sidewalls 80 can include at least one surface having a surface roughness greater than approximately RA 5 on ISO Roughness Grade. The surface roughness of sidewalls 80 may make sealing component 20 using conventional apparatuses challenging. In particular, as noted herein, many AM components can include surfaces with significant surface roughness, and the conventional apparatuses for sealing such components during leakage testing are deficient. In contrast, tool 10 is configured to effectively seal such a component, for leakage testing. It is understood that tool 10 could be implemented on any number of components, and may be applied to surfaces (e.g., sidewalls 80) which do not have significant surface roughness.

As noted herein, according to various embodiments, tool 10 can be used in a method of leakage testing a component, e.g., component 20. With reference to FIGS. 1-4, in some cases, a method can include:

Process P1: coupling leakage testing tool 10 to opening 40, 45 (or other openings within chamber 60) in component 20. As noted herein, in various embodiments coupling tool 10 to opening 40, 45 can further include securing component 20 within frame 200, e.g., by placing component 20 between base plate 210 and top plate 220, moving top plate 220 to contact component 20, and actuating locking members 240 along connecting rod 230 in order to lock component 20 between top plate 220 and base plate 210. In various embodiments, coupling leakage testing tool 10 to component 20 can also include forming a seal around component 20 using seal assembly 30. This process can include placing collar 70 and front plate 50 (including annular seal member 100, floating seal 130 and insert 90) around sidewalls 80 to form a seal over component 20, and create pressure chamber 60. This sealing process can further include tightening retaining members 250 against sidewalls 80 to secure collar 70 against component 20. In various embodiments, process P1 can include aligning seal assembly 30 around opening 40, 45 in component 20 in order to enhance the effectiveness of the seal. This process can include adjusting one or more of the retaining members 250, on an individual, group or sub-set basis, in order to create an effective seal around sidewalls 80 of component 20. In some cases, retaining members 250 can be iteratively adjusted to seal component 20, forming pressure chamber 60.

Process P2: flowing testing fluid (e.g., water) from fluid source 190 into pressure chamber 60 and opening 40, 45 in component 20 through valve 160. As described herein, this can include opening valve 160 to permit the flow of water or other fluid into pressure chamber 60. In various embodiments, this process can include measuring a pressure (using pressure gauge 170) in pressure chamber 60 in order to establish a baseline pressure within chamber 60 for leakage monitoring. Fluid flow can be stopped when a baseline pressure is reached. Baseline pressure for chamber 60 can be based upon a known volume of chamber 60 and a known volume of component 20, as well as the density of the water or fluid flowed into chamber 60. The baseline pressure can be calculated according to conventional approaches and/or other approaches discussed herein. For example, in various embodiments, the testing fluid is water, which is not compressible. In some cases, the test pressure is conducted at a multiple of the operating pressure under which component 20 is expected to operate, e.g., in a machine. In some example cases, the test pressure is approximately 1.1 to 1.9 times the operating pressure, and in particular cases, the test pressure can be approximately 1.5 times the operating pressure. Testing fluid is retained in component for a testing period, e.g., 10 minutes or longer, or in some cases 20-30 minutes.

Process P3: measuring a fluid flow (via flowmeter 180) or a pressure (via pressure gauge 170) within pressure chamber 60 to detect a leak in component 20. In various embodiments, this process can include periodically or continuously monitoring fluid flow or pressure in chamber 60 to determine whether the measured value deviates from a threshold indicative of a leak. For example, a pressure value within chamber 60 can be monitored to detect a drop by a threshold amount (e.g., greater than 0.3-0.7 bar, or in some cases, approximately 0.5 bar), indicating a leak in component 20 is causing the pressure to drop. In another example, a flow rate within chamber 60 can be monitored to detect an increase by a threshold amount (e.g., by an amount greater than a measurement error for the associated pressure gauge 170 and/or flowmeter 180), indicating a leak in component is causing the water or other fluid to leave component 20. As noted herein, the testing period can last for many minutes, and in some cases, may be extended beyond 30 minutes. During this period, pressure gauge 170 and/or flowmeter 180 can be monitored to detect any leak in component 20.

According to various embodiments, annular seal member 100 permits insert 90 to move relative to collar 70 during the processes of coupling leakage testing tool 10 with component 20 (process P1), to create a seal between collar 70 and sidewalls 80. In some particular cases, annular seal member 100 flexibly seals against an uneven surface on sidewall(s) 80 during the processes of flowing fluid into pressure chamber 60 and component 20 (process P2) and/or measuring a fluid flow or pressure in pressure chamber 60 (process P3). In particular cases, annular seal member 100 maintains the seal in space 120 during the process of measuring fluid flow or pressure in pressure chamber 60 (process P3). In some cases, floating seal 130 permits front plate 50 to move relative to collar 80 during the processes of coupling leakage testing tool 10 with component 20 (process P2) and after being fixed in place, floating seal 130 maintains a seal between front plate 50 and collar 70 during testing. According to embodiments, retaining member(s) 250 hold component 20 adjacent pressure chamber 60 during the flowing of the fluid into pressure chamber 60 and opening 40, 45 (process P2). Floating seal 130 can extend between first sealing slot 140 and second sealing slot 150 to flexibly seal front plate 50 to collar 70 during the processes of flowing fluid into pressure chamber 60 and component 20 (process P2) and/or measuring a fluid flow or pressure in pressure chamber 60 (process P3)

In various embodiments, processes described herein can be iterated (repeated) periodically (e.g., according to schedule of x times per y period, and/or continuously) in order to aid in leakage testing of one more portion(s) of one or more components 20. In some cases, one or more of the processes described herein can be repeated, for example, for a set of components, e.g., component 20.

It is understood that in the processes described herein, other processes may be performed while not being explicitly described, and the order of processes can be rearranged according to various embodiments. Additionally, intermediate processes may be performed between one or more described processes. The flow of processes described herein is not to be construed as limiting of the various embodiments.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A tool for leakage testing a component, the tool comprising:
    a seal assembly for sealing an opening in the component, the seal assembly having:
        a front plate defining a pressure chamber around the opening in the component;
        a collar coupled with the front plate and surrounding sidewalls of the component;
        an insert extending between the front plate and the collar;
        an annular seal member between the collar and the insert; and
        a floating seal between the collar and the front plate,
    wherein the seal assembly is configured to flexibly seal the opening in the component,
    wherein the annular seal member permits the insert to move relative to the collar while maintaining a seal between the collar and the sidewalls of the component; and
    a valve for controlling fluid flow into the pressure chamber during the leakage testing of the component.

2. The tool of claim 1, further comprising a frame for supporting the component.

3. The tool of claim 2, wherein the frame includes a base plate, a top plate, and a connecting rod coupling the base plate and the top plate.

4. The tool of claim 1, wherein the floating seal permits the front plate to move relative to the collar while maintaining a seal between the front plate and the collar.

5. The tool of claim 1, wherein the collar includes an angled interface proximate the insert defining a space between the collar and the insert, wherein the annular seal member is sized to fill the space.

6. The tool of claim 1, wherein the collar further includes at least one retaining member for holding the component adjacent the pressure chamber.

7. The tool of claim 6, wherein the at least one retaining member includes a plurality of retaining members.

8. The tool of claim 7, wherein the plurality of retaining members are positioned to align the component within the collar and retain the component relative to the pressure chamber.

9. The tool of claim 1, wherein the sidewalls of the component include at least one uneven surface.

10. The tool of claim 1, wherein the collar includes a first sealing slot and the front plate includes a second sealing slot opposing the first sealing slot, the floating seal extending between the first sealing slot and the second sealing slot.

11. A method of leakage testing a component, the method comprising:
coupling a leakage testing tool to an opening in the component, the leakage testing tool having:
a seal assembly for sealing the opening in the component, the seal assembly having:
a front plate defining a pressure chamber around the opening in the component;
a collar coupled with the front plate and surrounding sidewalls of the component;
an insert extending between the front plate and the collar;
an annular seal member between the collar and the insert; and
a floating seal between the collar and the front plate, wherein the collar includes an angled interface proximate the insert defining a space between the collar and the insert; and
a valve for controlling fluid flow into the pressure chamber;
flowing a testing fluid into the pressure chamber and the opening in the component through the valve,
wherein the annular seal member fills the space during the flowing of the testing fluid into the pressure chamber and the opening; and
measuring the fluid flow or a pressure within the pressure chamber to detect a leak in the component.

12. The tool of claim 11, wherein the leakage testing tool further includes a frame, wherein the coupling further includes securing the component within the frame.

13. The method of claim 11, wherein the annular seal member permits the insert to move relative to the collar during the coupling of the leakage testing tool to the opening in the component.

14. The method of claim 11, wherein the floating seal permits the front plate to move relative to the collar during the coupling of the leakage testing tool to the opening in the component.

15. The method of claim 11, wherein the collar further includes at least one retaining member, the at least one retaining member holding the component adjacent the pressure chamber during the flowing of the testing fluid into the pressure chamber and the opening, wherein the at least one retaining member includes a plurality of retaining members for aligning the component within the collar during the coupling.

16. The method of claim 11, wherein the sidewalls of the component include at least one uneven surface having a surface roughness of greater than RA 5 micrometers, wherein the annular seal member flexibly seals against the uneven surface during the flowing of the testing fluid and the measuring of the fluid flow or the pressure in the pressure chamber.

17. The method of claim 11, wherein the collar includes a first sealing slot and the front plate includes a second sealing slot opposing the first sealing slot, the floating seal extending between the first sealing slot and the second sealing slot and flexibly sealing the front plate to the collar during the flowing of the testing fluid and the measuring of the fluid flow or the pressure in the pressure chamber.

18. A tool for leakage testing a component, the tool comprising:
a seal assembly for sealing an opening in the component, the seal assembly having:
a front plate defining a pressure chamber around the opening in the component;
a collar coupled with the front plate and surrounding sidewalls of the component;
an insert extending between the front plate and the collar;
an annular seal member between the collar and the insert; and
a floating seal between the collar and the front plate,
wherein the collar includes an angled interface proximate the insert defining a space between the collar and the insert, wherein the annular seal member is sized to fill the space,
wherein the seal assembly is configured to flexibly seal the opening in the component; and
a valve for controlling fluid flow into the pressure chamber during the leakage testing of the component.

19. The tool of claim 18, wherein the sidewalls of the component include at least one uneven surface.

20. The tool of claim 18, further comprising a frame for supporting the component.

* * * * *